United States Patent Office 3,505,366
Patented Apr. 7, 1970

3,505,366
PROCESS FOR PREPARING THIOLCARBOXYLIC ACIDS
Carl C. Greco, Bronx, and Walter Stamm, Tarrytown, N.Y., assignors to Stauffer Chemical Company, New York, N.Y., a corporation of Delaware
No Drawing. Filed Jan. 19, 1968, Ser. No. 699,037
Int. Cl. C07c *153/01*
U.S. Cl. 260—399    9 Claims

ABSTRACT OF THE DISCLOSURE

A process for preparing aliphatic thiolcarboxylic acids of the formula:

$$R-\overset{O}{\underset{\|}{C}}-SH$$

wherein R is an aliphatic radical of from 4 to 23 carbon atoms. The process comprises reacting an acid halide of the formula:

$$R-\overset{O}{\underset{\|}{C}}-X$$

wherein R is as previously defined and X is a halogen having an atomic weight above 30, with hydrogen sulfide in the presence of an inert gas.

---

This invention relates to organic thiolacids and more particularly to a process for preparing aliphatic thiolcarboxylic acids by the reaction of aliphatic acid halides with hydrogen sulfide in the presence of an inert gas.

There have been reported in the literature several processes for the preparation of thiolacetic acid. For example Schiff reported in 1895 the preparation of thiolacetic acid from acetic acid and phosphorus pentasulfide in yields of from 30 to 35% (Ber. 28, 1204). Much later there was reported a preparation for thioacetic acid comprising reacting acetyl chloride and hydrogen sulfide in the presence of an amine (Sunner et al. Swedish Patent No. 115,121). These processes, while convenient for the laboratory, do not lend themselves to commercial use because of low yields or high cost occasioned by the use of the amine hydrogen halide acceptors. Consequently, these processes to applicants knowledge have not been used for the preparation of the fatty thiol acids of from 5 to 24 carbon atoms.

In accordance with this invention it has been found that the fatty thiol acids can be prepared inexpensively in good yield by reacting an aliphatic acid halide of from 5 to 24 carbon atoms with hydrogen sulfide in the presence of an inert gas. By this method the corrosive hydrogen halide by-product is removed from the reaction mixture as it is formed so as to prevent the decomposition of the product and damage to the process apparatus. Moreover, no hydrogen halide acceptor need be employed which effects a considerable reduction in cost by eliminating both the amine recovery step and the use of the amine. The process is not as useful for the preparation of the thioacids of less than about 5 carbon atoms, however, because of their higher volatilities.

The reaction can be illustrated by the following reaction diagram wherein R is an aliphatic hydrocarbon radical of from 4 to 23 carbon atoms and X is a halogen having an atomic weight about 30.

$$R-\overset{O}{\underset{\|}{C}}-X + H_2S \xrightarrow{\text{inert gas}} R-\overset{O}{\underset{\|}{C}}-SH + HX\uparrow$$

The aliphatic hydrocarbon radicals represented by R can be saturated or unsaturated, branched or unbranched, acyclic or cyclic and can be substituted with any relatively inert radical. Examples of suitable saturated radicals include: butyl, sec-butyl, pentyl, isohexyl, hexyl, heptyl, isooctyl, octyl, nonyl, isodecyl, decyl, undecyl, dodecyl, tridecyl, tetradecyl, pentadecyl, hexadecyl, heptadecyl, octadecyl, nondecyl, eicosyl and heneicosyl, cyclohexyl, ethylcyclohexyl, cyclohexylethyl, phenylethyl, 2-ethylhexyl, 2-dimethylpropyl, etc. Examples of suitable unsaturated radicals include: ethenyl, propenyl, butenyl, pentenyl, hexenyl, heptenyl, octenyl, nonenyl, decenyl, hexadecenyl and eicosenyl. Examples of relatively inert radicals include aryl groups, alkyl groups, ester or carbalkoxy groups, halogens such as fluorine, chlorine and bromine, as well as cyano, oxy and thioether groups.

The hydrogen halide by-product is removed by introducing a dry, inert gas into the reaction mixture at a rate sufficient to remove the hydrogen halide by-product as it is formed. Exemplary of suitable inert gases which can be employed include nitrogen, carbon dioxide, neon, xenon, argon, carbon monoxide and the lower alkanes such as methane, ethane, propane and butane or natural gas.

Acid halides which can be employed in the invention process are the chlorides and bromides of substituted and unsubstituted, saturated and unsaturated aliphatic carboxylic acids having from 5 to 24 carbon atoms. For economic reasons the chlorides are, of course, preferred. Representative examples include: isovaleroyl chloride, caproyl chloride, neo-heptanoyl chloride, n-heptanoyl chloride, pelargonic acid chloride, undecylenic acid chloride, ω-bromo-undecanoyl chloride, cinnamoyl chloride, hydrocinnamoyl chloride, beta-phenoxypropanoyl chloride, lauroyl chloride, palmitoyl chloride, cyclohexyl carboxylic acid chloride, stearoyl chloride, tetrachlorostearoyl chloride, α-chlorostearoyl chloride, α-thioethylstearoyl chloride, oleoyl chloride, 9,10-dibromostearoyl chloride, and behenic acid chloride. Also mixtures of aliphatic acid chlorides and mixtures of substituted acid chlorides can be used such as are obtained from natural fats and oils, e.g., coconut acid chlorides and tallow acid chlorides. The hydrocarbon moiety R can be substituted with any relatively inert radical such as fluorine, chlorine, bromine, nitro or amino groups. Acetylenic unsaturated carboxylic acid halides can also be employed in the process of the invention, such as, for example, the chlorides of amylpropiolic acid, palmitolic acid, stearolic acid and behenolic acid. The hydrocarbon radicals can also contain ether or thioether linkages.

Dicarboxylic acid halides can also be employed. They can be represented by the formula:

$$X-\overset{O}{\underset{\|}{C}}-(R')_n-\overset{O}{\underset{\|}{C}}-X$$

wherein X is as previously defined, R' is a divalent radical of from 1 to 10 carbon atoms, and n is an integer of from 0 to 1. Both aliphatic saturated and unsaturated acid halides can be employed. Examples of suitable saturated compounds include the acid halides of: oxalic, malonic, succinic, glutaric, adipic, pimelic, suberic, azelaic, sebacic, and brassic. Examples of suitable unsaturated compounds include the acid halides of fumaric, maleic, glutaconic, allylmalonic, tetrahydrophthallic and tetraconic. Mixtures of both saturated and unsaturated mono and dicarboxylic acid halides can be employed if desired. While the dithiolcarboxylic acids have many uses, they are particularly useful in the processing of rubber and as polyvinyl chloride stabilizers.

If desired a solvent can be employed, but none is required. Illustrative of inert solvents which can be employed include the lower saturated alkanes of from 3 to 20 carbon atoms, halogenated saturated alkanes of from 4 to 10 carbon atoms, aromatic hydrocarbons of from 6 to 20 carbon atoms, and ethers of from 4 to 20 carbon atoms. Examples of suitable alkane solvents include propane, butane, pentane, heptane, hexane, nonane, decane and dodecane. Alicyclics can also be employed such as cyclopentane and cyclohexane. Examples of suitable halogenated alkanes which include both chloro- and fluoro-substituted are: ethyl chloride and dichlorodifluoromethane. Examples of suitable aromatic hydrocarbons include benzene, toluene, xylene, mesitylene, ethyl benzene, ethyl toluene and naphthalene. Examples of ethers include diethyl, diisopropyl, dibutyl, anisole, phenetole, and the like.

The proportions of reactants are not critical. It is preferred, however, that an excess of hydrogen sulfide be employed of from about 100% to about 1000% by weight in order to obtain a quick reaction. Excess hydrogen sulfide can be recycled for reuse in the reaction.

The temperature of the reaction should be sufficiently high to prevent the reaction mixture from becoming viscous and will generally be from about 50° C. to about 200° C. It is preferred, however, that the temperature be maintained between about 60° C. and about 125° C. Although the reaction can be conveniently conducted at atmospheric pressure, superatmospheric or subatmospheric pressures can be employed to advantage especially with lower alkane solvents such as propane and butane. Subatmospheric pressure is advantageous as it facilitates the quick removal of the hydrogen halide gas by-products.

In order to obtain complete reaction, the reaction mixture is agitated and preferably at a vigorous, turbulent rate. When the reaction is complete, as evidenced by no further hydrogen halide evolution or hydrogen sulfide absorption, the product can be recovered by the conventional means, such as filtration or distillation, and can be further purified, if desired, by crystallization, distillation and the like.

EXAMPLE 1

Preparation of thiolstearic acid

To a 1-liter, 3-necked flask equipped with gas inlet tube, stirrer, thermometer and an 18 inch packed distillation column, is added 200 cc. of benzene. The column is open at the top and connected to a dropping funnel and gas outlet tube. The flask containing 200 cc. of benzene is heated to refluxing temperature and hydrogen sulfide is introduced into the reaction flask by passing it through the benzene layer at a rate of two thirds of a mole per hour. Through the dropping funnel at the top of the distillation column is added 50 grams of stearoyl chloride over a period of three hours. Nitrogen is introduced into the reaction mixture at a rate sufficient to remove the hydrogen chloride by-product as formed and the reaction is continued for three hours. After the reaction is complete, as evidenced by no further hydrogen chloride evolution, the reaction is terminated and the reaction mixture allowed to cool to room temperature. The impurities are removed by filtration and the reaction mixture is distilled at reduced pressure to remove the benzene solvent. Thirty-three grams of pure thiolstearic acid is recovered as residue for a yield of 66%.

EXAMPLE 2

Preparation of thiollauric acid

In accordance with the procedure of Example 1, thiollauric acid is prepared from lauroyl chloride and hydrogen sulfide.

EXAMPLE 3

Preparation of thiolcaproic acid

In accordance with the procedure of Example 1, thiolcaproic acid is prepared from caproyl chloride and hydrogen sulfide.

The thiolcarboxylic acids can be employed to protect a number of polymers against degradation and discoloration due to heating. They are particularly effective in stabilizing the halogen-containing hydrocarbon polymers such as polyvinyl chloride and polyvinylidene chloride. The presence of between about 0.01% and about 10% by weight of the stabilizer compound will be sufficient for most applications, although the preferable range is between about 1% and about 5% on a weight basis. The following examples illustrate the employment of the thioanhydrides as stabilizers.

EXAMPLES 4–7

The compounds of 1, 2 and 3 (3 grams each) are blended respectively with 100 grams of polyvinyl chloride resin and 30 grams of dioctyl phthalate plasticizer. Each blend is milled at a temperature of 325° F. Samples of resin are removed from the hot mill at ten minute intervals and examined. All of the samples are white and clear at the end of 50 minutes milling time.

What is claimed is:

1. A process for preparing aliphatic thiolcarboxylic acids of the formula:

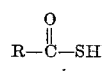

wherein R is an aliphatic radical of from 4 to 23 carbon atoms which comprises reacting an aliphatic acid halide of the formula:

wherein R is as previously defined and X is a halogen having an atomic weight above 30, with hydrogen sulfide in the presence of an inert gas added at a rate sufficient to remove the hydrogen halide by-product as it is formed.

2. The process of claim 1, wherein the reaction is conducted in the presence of an inert solvent.

3. The process of claim 1, wherein the excess of hydrogen sulfide is present of from about 100% to about 1000%.

4. The process of claim 1, wherein the reactants are vigorously agitated.

5. The process of claim 1, wherein the temperature of the reaction is maintained between about 50° C. and about 200° C.

6. The process of claim 1, wherein the temperature of the reaction is maintained between about 60° C. and about 125° C.

7. The process of claim 1, wherein the acid halide is stearoyl chloride.

8. The process of claim 1, wherein the acid halide is lauroyl chloride.

9. The process of claim 1, wherein the acid halide is caproic chloride.

References Cited

Sunner et al.: Chemical Abstracts 38, 3249 (1944).
Fredga et al.: Chemical Abstracts 45, 541 (1951).

DANIEL D. HORWITZ, Primary Examiner

U.S. Cl. X.R.

260—45.7, 502.6

PO-1050
(5/69)

UNITED STATES PATENT OFFICE
CERTIFICATE OF CORRECTION

Patent No. 3505366      Dated April 7, 1970

Inventor(s) Carl C. Greco, Walter Stamm

It is certified that error appears in the above-identified patent and that said Letters Patent are hereby corrected as shown below:

Col 1, line 66, "about" should be --above--
Col 3, line 30, "haydrogen" should be --hydrogen--

SIGNED AND
SEALED
AUG 11 1970

(SEAL)
Attest:

Edward M. Fletcher, Jr.
Attesting Officer

WILLIAM E. SCHUYLER, JR.
Commissioner of Patents